Dec. 13, 1966 J. M. EITEL 3,291,256

APPARATUS FOR PLACING AERIAL FLEXIBLE ELONGATE MEMBERS

Original Filed Sept. 13, 1963 10 Sheets-Sheet 1

INVENTOR.
Jay M. Eitel
BY Flehr and Swain
Attorney

APPARATUS FOR PLACING AERIAL FLEXIBLE ELONGATE MEMBERS

Original Filed Sept. 13, 1963 10 Sheets-Sheet 2

INVENTOR

Jay M. Eitel

BY [signature]

ATTORNEYS

APPARATUS FOR PLACING AERIAL FLEXIBLE ELONGATE MEMBERS

Original Filed Sept. 13, 1963

INVENTOR.
Jay M. Eitel
BY Flehr and Swain
Attorneys

Dec. 13, 1966 J. M. EITEL 3,291,256

APPARATUS FOR PLACING AERIAL FLEXIBLE ELONGATE MEMBERS

Original Filed Sept. 13, 1963 10 Sheets-Sheet 4

INVENTOR.
Jay M. Eitel
BY [signature]
Attorneys

INVENTOR.
Jay M. Eitel
BY Flehr and Swain
Attorneys

APPARATUS FOR PLACING AERIAL FLEXIBLE ELONGATE MEMBERS

Original Filed Sept. 13, 1963

INVENTOR.
Jay M. Eitel
BY [signature]
Attorneys

INVENTOR.
Jay M. Eitel
BY Flehr and Swain
Attorneys

INVENTOR.

Jay M. Eitel

BY Flehr and Swain

Attorneys

APPARATUS FOR PLACING AERIAL FLEXIBLE ELONGATE MEMBERS

INVENTOR.

Jay M. Eitel

BY Fisher and Swain

Attorneys

APPARATUS FOR PLACING AERIAL FLEXIBLE ELONGATE MEMBERS

Original Filed Sept. 13, 1963 10 Sheets-Sheet 10

INVENTOR.
Jay M. Eitel
BY
Fehr and Swain
Attorneys 3,291,256
APPARATUS FOR PLACING AERIAL FLEXIBLE ELONGATE MEMBERS Jay M. Eitel, Los Altos, Calif., assignor to Telsta Corporation, San Carlos, Calif., a corporation of California
Continuation of application Ser. No. 308,852, Sept. 13, 1963. This application Oct. 18, 1965, Ser. No. 497,425
8 Claims. (Cl. 182—129)

This application is a continuation of my application, Serial No. 308,852, filed September 13, 1963, which is a continuation-in-part of my application, Serial No. 227,-516, filed October 1, 1962, now abandoned but, which is a continuation-in-part of my application, Serial No. 211,-751, filed July 23, 1962, now abandoned, which is a continuation of my application, Serial No. 9,726, filed February 19, 1960, now abandoned.

This invention relates to an apparatus for placing flexible elongate aerial members and more particularly self-supporting aerial telephone cable, self-supporting power lines or conductors, messenger or strand and telephone and power cables supported by messenger or strand.

In the placing of telephone cable and messenger, the carrying of the reels upon which the cable or messenger is wound has posed a problem. Heretofore, special reel carrying trailers have been devised and towed behind the truck utilized for placing the cable or messenger. The use of trailers in such an application has the normal disadvantages attendant upon trailer use. In addition, there is the relatively high cost of procuring the trailers initially. To eliminate the use of trailers, certain manufacturers have mounted reel carrying apparatus upon the rear end of the truck itself. This, however, has not been completely satisfactory because it places a great deal of weight upon the rear wheels of the truck and, therefore, has a tendency to make the truck unstable. In addition, it has been found that when the reels are mounted in this manner, the size of the reels which can be mounted on the truck is limited. Mounting of the reels on the rear end of the truck or placing the reels in a trailer also has the disadvantage in that the cable in being placed normally, must be passed through bends which approximate 180°. Such bends compress the conductor insulation on one side of the conductor and stretches it on the other side to often physically damage the cable. There is, therefore, a great need for means for mounting the cable reel which will facilitate placement of the messenger and cable without damaging the cable.

In general, it is an object of the present invention to provide apparatus for placing aerial flexible elongate members which overcomes the above named disadvantages.

Another object of the invention is to provide apparatus of the above character in which there is good weight distribution.

Another object of the invention is to provide apparatus of the above character in which the cable can be placed without placing a bend substantially greater than 90° in the cable.

Another object of the invention is to provide apparatus of the above character in which reel carrying means is provided ahead of the boom structure.

Another object of the invention is to provide apparatus of the above character in which means is provided on the vehicle for loading the reels onto the reel carrying means.

Another object of the invention is to provide apparatus of the above character utilizing a guide wheel which freely follows the cable or messenger as it is removed from the reel and put into place.

Another object of the invention is to provide apparatus of the above character in which the guide wheel can slide substantially the full width of the vehicle to take advantage of the full width of the truck so as to facilitate placement of cable from either the right or left side of the vehicle.

Another object of the invention is to provide apparatus of the above character in which more than one reel can be mounted on the reel carrying means.

Another object of the invention is to provide apparatus of the above character in which the use of a castered bull wheel is not required.

Another object of the invention is to provide apparatus of the above character in which the reels are moved about a vertical axis.

Another object of the invention is to provide apparatus of the above character in which the reels are moved with the load supporting structure for the boom structure.

Another object of the invention is to provide apparatus of the above character in which the reels serve as counterbalancing means for the boom structure.

Additional objects and features of the invention will appear from the following description in which the preferred embodiments have been set forth in detail in conjunction with the accompanying drawings.

Referring to the drawings.

In general, the present invention consists of a wheeled vehicle in which a boom structure is mounted on the vehicle. Cable guiding means is disposed on the outer end of the boom structure and reel carrying means is disposed on the vehicle so that it can pay cable out forwardly of the boom structure in a direction substantially rearward and over the cable guiding means.

Figures 1, 2:
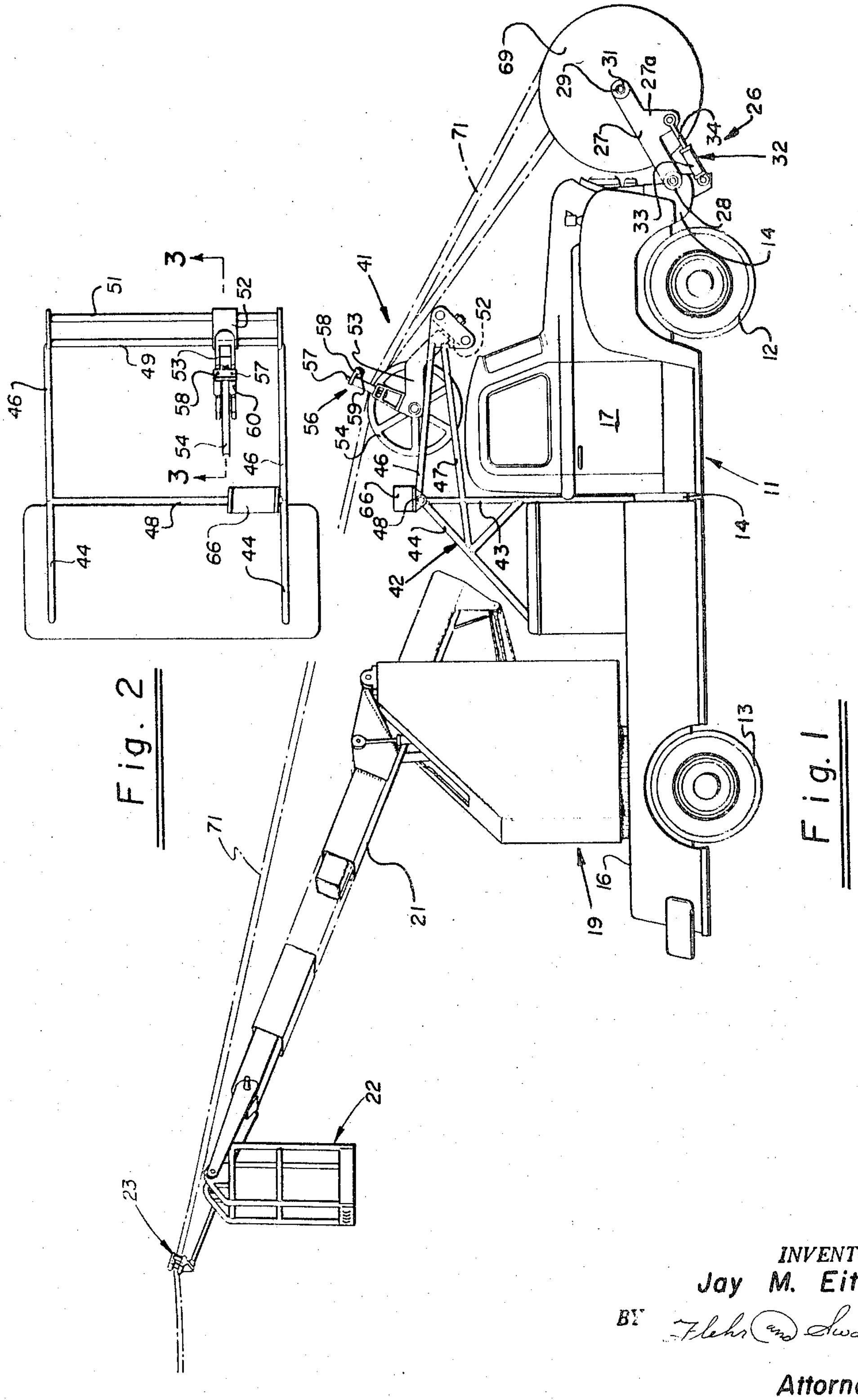
FIGURE 1 is a side elevational view of an apparatus for placing aerial telephone cable or messenger which incorporates the present invention.
FIGURE 2 is a partial plan view of the apparatus shown in FIGURE 1.
Figure 3:
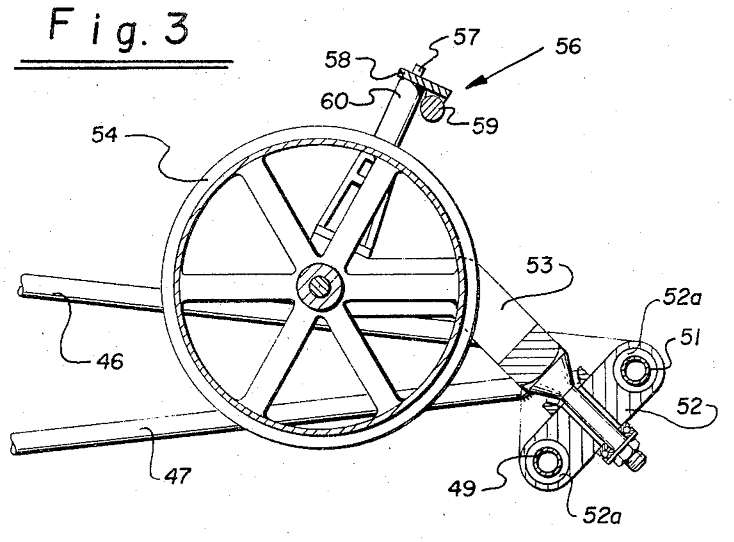
FIGURE 3 is a cross-sectional view taken along the line 3—3 of FIGURE 2.

The apparatus for placing aerial cable and messenger, as shown in FIGURES 1–3, consists of a self-propelled vehicle 11 having front and rear wheels 12 and 13, and a framework 14 mounted upon the wheels. The vehicle also includes a platform 16 mounted on the rear end of the framework and a cab 17 mounted on the front end of the framework. A lifting equipment 19 is mounted on the rear end of the framework 14 and generally overlies the rear wheels 13. The lifting equipment 19 is similar to that described in Patents Nos. 2,841,404; 2,896,750 and 2,936,847 and includes a boom structure 21 and means (not shown) for extending and retracting the boom structure, swinging the boom structure about a horizontal axis and rotating the boom structure about a vertical axis. A workman's basket 22 is pivotally mounted on the outer end of the boom structure 21. Cable guiding means 23 similar to that described in my copending application, Serial No. 641,907, filed February 25, 1957, now Patent No. 2,949,279, is also mounted on the outer end of the boom structure. As disclosed in Patent No. 2,841,404, a control switch 24 is mounted in a basket 22 and a removable control box 25 is mounted on the lifting equipment for movement of the boom structure as set forth above.

Reel carrying means 26 is mounted on the vehicle in a region forward of the boom structure and, as shown particularly in FIGURE 1, is mounted on the front of the vehicle. The reel carrying means consists of a pair of arms 27 each having one of their ends pivotally connected to the forward end of the framework 14 at 28. A shaft or spindle 29 is rotatably mounted in bearings 31, mounted on the outer ends of the arms 27.

Means is provided for raising and lowering the arms 27 and consists of hydraulic actuating means 32 which includes cylinders 33 having one end pivotally mounted to the framework and piston rods 34 pivotally connected to extensions **27*a* of the arms 27**. The hydraulic actuating means also includes a source of hydraulic fluid under pressure and control means (not shown) for operating the hydraulic cylinders.

Cable guiding means 41 is disposed between the boom structure and the reel carrying means 26. It consists of a framework 42 secured to the frame 14 of the vehicle as shown. The framework includes a pair of vertical members 43 which are secured to the frame and bracing members 44. It also includes substantially horizontal members 46 and 47, and transverse members 48, 49 and 51. A slide block 52 is slidably mounted on the members 49 and 51 for movement longitudinally of the members 49 and 51 by slide bearings **52*a*. A yoke-like frame 53 is swivelled or rotatably mounted in the slide block 52. A guide or bull wheel 54** is rotatably carried in the yoke.

Additional cable guiding means 56 is mounted on the yoke-like frame 53 and generally overlies the guide wheel 54. It is very similar to the cable guiding means mounted on the end of the boom structure. It includes a pair of substantially vertical rollers 60 disposed on opposite sides of the frame 53 and rotatably mounted on pins 57 fixed to the frame 53. A member 58 is rotatably mounted on one of the pins 57 and carries a substantially horizontal roller 59. The member 59 is adapted to be releasably secured to the other pin 57 to hold the cable in place after it has been placed between the two vertical rollers.

A pad 66 is mounted on the framework 42 and is utilized for supporting the boom structure when the vehicle is not being utilized on the job.

Operation and use of the apparatus for placing aerial cable or messenger may now be briefly described as follows. The truck or vehicle is first driven to the job site. Normally, the cable reels are delivered to the job site. However, if desired, the cable reel or reels can be mounted on the vehicle and carried by the vehicle to the job site.

In mounting a cable reel on the vehicle, the hydraulic actutaing means 32 is operated to lower the arms 27. The shaft 29 is then removed from the arms 27 and the vehicle is advanced so that the arms are disposed outside the sides of the cable reel 69. As soon as the vehicle has been driven into position, the outer ends of the arms 27 are again positioned by the hydraulic actuating means so that the bearings 31 are in alignment with the hole in the cable reel. The shaft 29 is then pushed through the cable reel and into the bearings 31 and fixed in this position. As soon as the shaft 29 has been put in place, the hydraulic actuating means is operated to lift the cable reel above the surface of the ground. The cable 71 is then removed from the reel and threaded through the cable guiding means 56 over the guide wheel 54 and through the cable guiding means 23 carried by the outer end of the boom structure. The cable or messenger may then be placed in a conventional manner.

It will be noted as the vehicle is advanced in a forward direction that the cable is taken directly from the reel and passed over the cable wheel 54 without any substantial bond being placed in the cable. When the cable is bent, it is bent in the same direction as when it was wrapped into the cable drum. At no time is the bend in the cable reversed to unduly stress the cable. The same is true for the cable as it passes from the cable wheel through the cable guiding means 56 carried by the outer end of the boom structure. The angle of the boom structure, of course, will change. However, at no time will it be likely that an angle greater than 90° will be placed in the cable. In fact, most of the time, only a very small bend will be placed in the cable.

Placing the cable reel carrying means on the front of the vehicle, as shown in the drawing, stabilizes the vehicle because of the better weight distribution obtained. This is particularly advantageous when it is desirable to place the cable under tension while it is being strung or placed.

The spindle 29 utilized for carrying the cable reel is normally of a length which is substantially greater than the width of the cable reel. Therefore, if desired, more than one cable reel can be mounted on the spindle. If only one cable reel is mounted on the spindle, it is possible to position the cable reel on the spindle by merely placing pins (not shown) through the spindle on both sides of the cable reel. Thus, for example, if cable is being placed on one side of the road, it is generally desirable to drive the truck adjacent that side of the road. To compensate for the slope of the road, the cable reel can be shifted to the opposite side of the cable spindle to stabilize the truck and to prevent the truck from accidentally upsetting. This is particularly advantageous in bad weather where soft spots may be encountered when driving off the shoulder of the road.

During the cable placement, the guide wheel 54 follows the cable as it is unreeled from the cable reel. This is made possible by the slidable mounting for the cable reel provided by the slide block 52 and the swivel mounting for the guide wheel. Thus, as the cable is unreeled from the cable reel and the cable moves from one side of the cable reel to the other, the guide wheel automatically follows the movement of the cable and guides the cable to the cable guiding means carried by the outer end of the boom structure while at the same time placing the minimum possible bend in the cable.

It will be noted from the drawings that the cable guiding means has been constructed so as to take advantage of the full width of the vehicle so that the guide wheel can move from one side of the vehicle to the other. This is particularly advantageous in that it permits strand or cables to be placed with equal ease from both sides of the vehicle with a minimum of bend in the cable. This has been found to be particularly important where the apparatus is used for placing cable on a pole line which is relatively straight on a winding road where the pole line often shifts from one side of the road to the other.

Figures 5, 6:
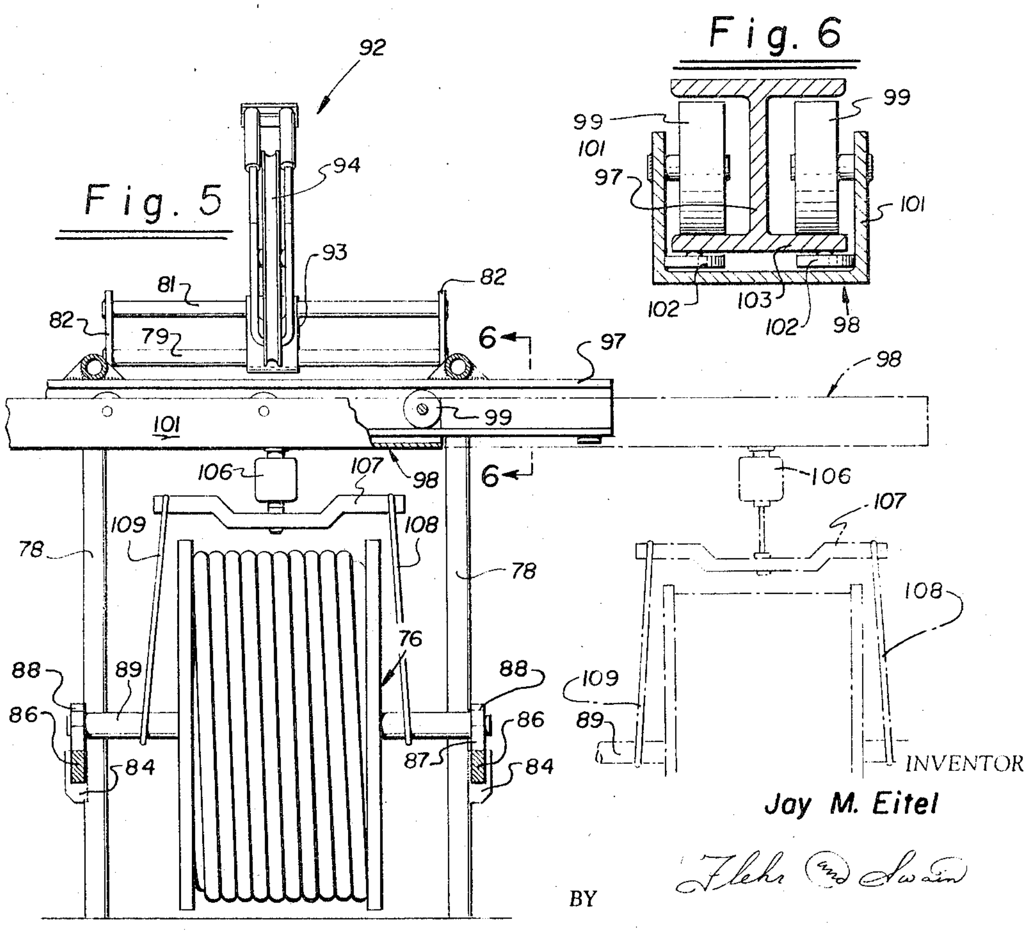
FIGURE 5 is a cross-sectional view taken along the line 5—5 of FIGURE 4.
FIGURE 6 is a cross-sectional view taken along the line 6—6 of FIGURE 5.
Figure 4:
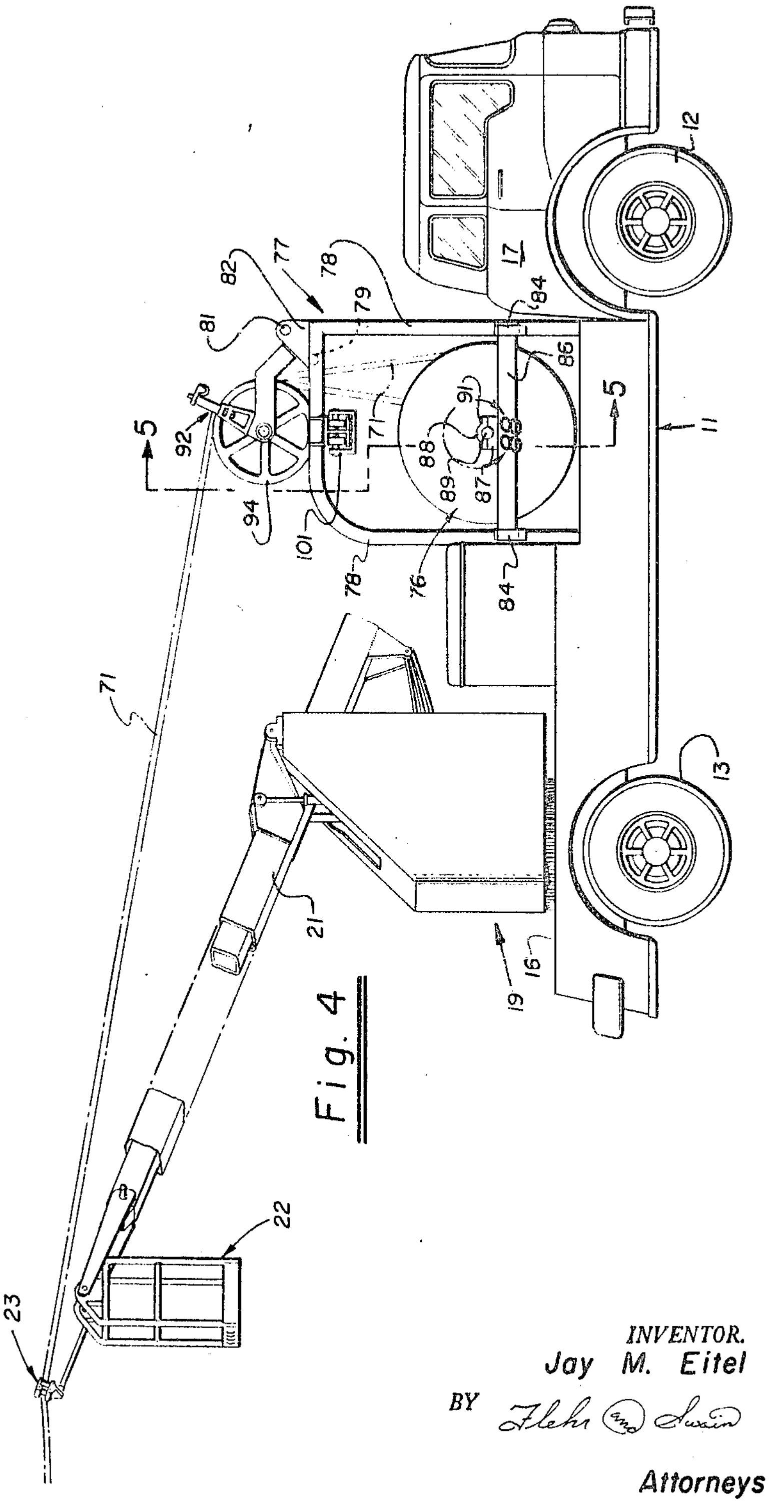
FIGURE 4 is a side elevational view of another embodiment of my apparatus.

Another embodiment of my apparatus for placing aerial cable is shown in FIGURES 4, 5 and 6. A vehicle 11 similar to that hereinbefore described is provided. The primary difference is that it is a larger vehicle with a longer wheel base and with a construction which is conventionally termed "cab over engine." A lifting equipment 19 identical to that hereinbefore described is mounted on the framework of the vehicle over the rear wheels 13.

Reel carrying means is also mounted on the vehicle forward of the boom structure. However, in this instance, the reel carrying means 76 is mounted on the frame of the vehicle between the cab 17 of the vehicle and the lifting equipment 19. The reel carrying means 76 consists of a framework 77 comprised of a pair of substantially U-shaped members 78 mounted on opposite sides of the framework of the truck. The framework also includes a transverse rod 79 secured to the members 78 and another transverse rod 81 secured to ears 82 mounted on the members 78. A pair of brackets 84 is secured to each of the U-shaped members 78 and provide U-shaped slots which accommodate the ends of a rigid bar 86 disposed on the outer sides of the U-shaped members 78. The bars 86 carry bearing blocks 87 intermediate the ends thereof which have upper pivotally mounted portions 88 adapted to be swung to an open position to receive the ends of a shaft or spindle 89 and adapted to be clamped into place by wing nuts 91.

Cable guiding means is also included in this embodiment of the invention. The cable guiding means 92 is very similar to that hereinbefore described and includes a slide block 93 slidably mounted on the transverse rods 79 and 81. A guide wheel 94 is swivelled in the slide block in a manner identical to that hereinbefore described. Additional cable guiding means 92 identical to that hereinbefore described is also provided.

Means is provided for lifting cable reels onto the reel carrying means and consists of an I-beam 97 which is secured to the bottom sides of the top portions of the inverted U-shaped members 78. The I-beam extends transversely of the frame of the vehicle and generally in alignment with the shaft or spindle 89. A U-shaped channel 98 is slidably mounted on the I-beam by means of rollers 99 rotatably mounted on the upstanding legs 101 of the U-shaped channel. A plurality of side guide rollers 102 are mounted on opposite sides of the lower flange 103 of the I-beam 97 and are adapted to engage the upstanding legs 101 of the U-shaped channel. A chain hoist 106 of conventional type is mounted on the U-shaped channel 98 and carries a yoke 107 to which are attached loops of chains 108 and 109, releasably secured to the yoke 107.

The operation and use of this embodiment of my invention is similar to that for the embodiment hereinbefore described. However, in this embodiment of the invention, the reel carrying means differs substantially from that described in the foregoing embodiment. In this embodiment of the invention, when it is desired to load a reel into the reel carrying means on the vehicle, the truck is positioned so that the reel which is to be loaded into the reel carrying means is in general alignment on one side of the truck with the reel carrying means. The U-shaped channel 98 is then pulled outwardly along the I-beam until the chain hoist 106 generally overlies the reel. The shaft or spindle 89 is then removed from the reel carrying means and inserted through the cable reel at the same time one of the bars 86 is removed. The chains 108 and 109 are then looped around the spindle 89 and secured to the yoke 107. The chain hoist is then operated to lift the reel from the ground. Thereafter, the U-shaped channel with the reel is pushed inwardly through the adjacent U-shaped member until it is disposed between the two U-shaped members. Thereafter, the bar 86 which has been removed is dropped into the brackets 84 and the bearing blocks are opened and the reel with the spindle 89 lowered into the bearing blocks. Thereafter, the chains 108 and 109 are removed from the spindle and from the yoke.

The operation and use of the remaining portions of the apparatus are substantially identical to that hereinbefore described. The cable 71 is passed over the guide wheel 94 and through the cable guiding means 92 and through the cable guiding means carried by the outer end of the boom structure. In this embodiment of the invention, it will be noted that a bend slightly greater than the bends placed in the cable in the embodiment hereinbefore described are made in the cable. However, it will be noted that the bends placed in the cable never are greater than 90°.

The mounting of the cable reel in this manner behind the cab of the vehicle also helps to stabilize the vehicle because the cable reel is well forward of the lifting equipment. The construction is such that the view of the operator of the vehicle is unimpeded.

It is readily apparent that, if desired, the framework of the reel carrying means can be constructed so that additional reels can be carried on the spindle 89 merely by increasing the spacing between the U-shaped members 78.

Figure 7:
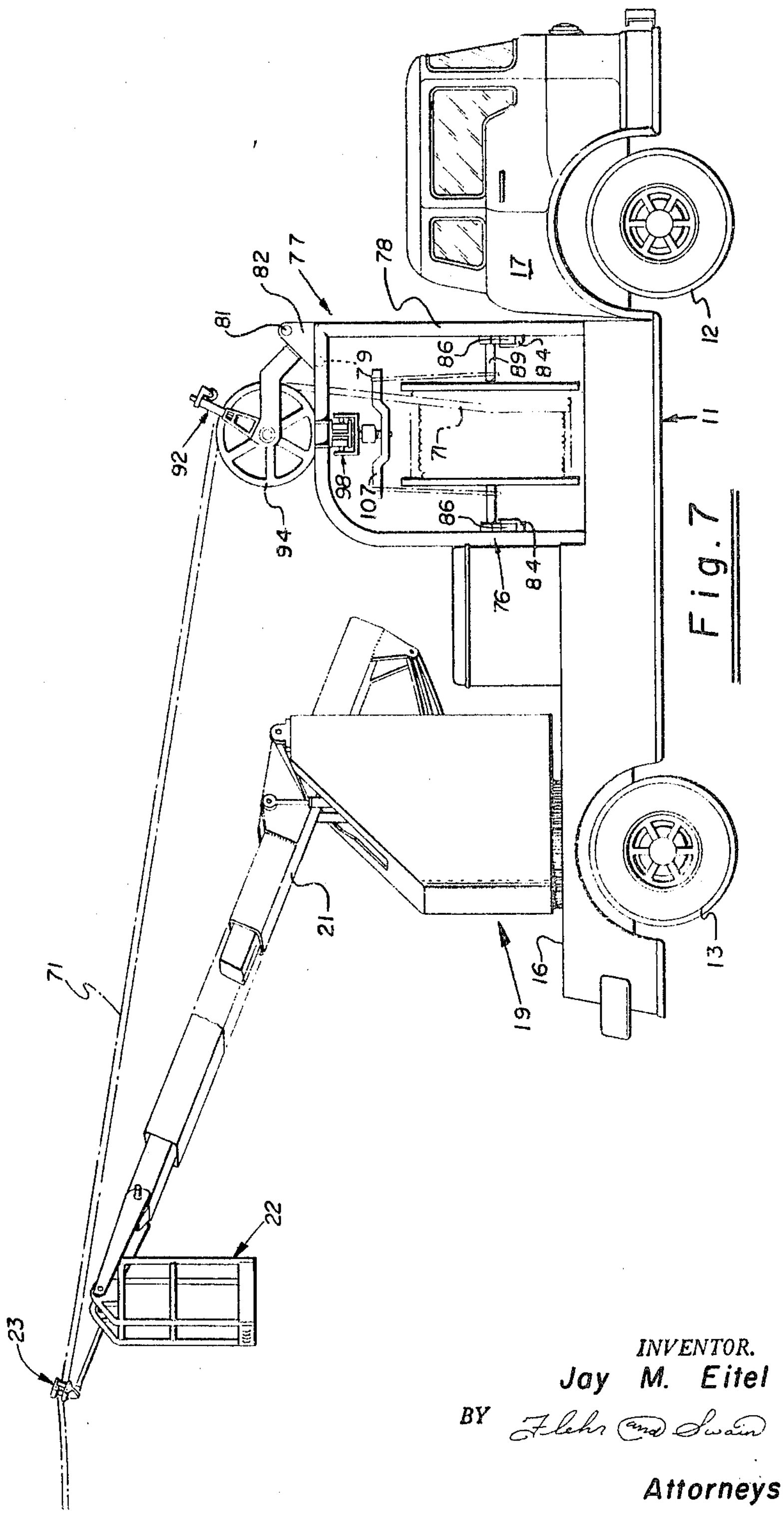
FIGURE 7 is a side elevational view of still another embodiment of my apparatus.

Another embodiment of my invention is shown in FIGURE 7. It is very similar to that described in FIGURES 4, 5 and 6, with the exception that the spindle or shaft 89 of the reel carrying means is mounted so that it extends in a direction which is parallel to rather than at right angles to the longitudinal axis of the truck or vehicle. In this case, the bars 86 extend transversely of the vehicle rather than longitudinally of the vehicle. This type of construction may be found to be advantageous where the space between the cab of the vehicle and the lifting equipment is limited. This is possible because normally the reel width is less than the diameter.

It will also be noted that in this embodiment of the invention, a bend of greater than 90° is never placed in the cable. The stability advantages are still retained.

Still another embodiment of my apparatus for placing aerial cable is shown in FIGURES 9 through 16. A vehicle 11 similar to that shown in FIGURE 7 is provided. A lifting equipment 19 identical to that hereinbefore described is mounted on the vehicle over the rear wheels 13. Reel carrying means 121 is also provided. However, in this instance, the reel carrying means includes the means for lifting the reels onto the vehicle.

The reel carrying and loading apparatus 121 consists of a framework 122 which is secured to the frame 14 of the vehicle. A pair of reel carrying arms 123 are pivotally connected to the framework 122 on opposite sides thereof at points 124. A linkage is provided for raising and lowering the arms 123 in unison and consists of a pair of members 126 having their ends pivotally connected to the arms 123 and having the other ends pivotally connected to additional members 127. The members 127 are pivotally connected to the framework 122 at points 128. Suitable means is provided for operating the linkage and, as shown, consists of hydraulic actuators 129 which have their cylinders 131 pivotally connected to the linkage at the point of connection of the members 126 and 127.

The arm 123 is provided with a pair of arcuate notches 136 and 137 which are adapted to serve as saddles as hereinafter described. Clamping means 141 is mounted over each of the saddles 136 and 137 and consists of a cover member 142 which is provided with a curved portion 143 to accommodate the shaft or axle mounted in the saddle as hereinafter described. The cover plate 142 is pivotally mounted between a pair of members 144 affixed to the arm 123. The cover member 142 is provided with an open ended slot 146 which is adapted to accommodate an upstanding threaded bolt 147 mounted in the arm 123. A nut 148 is adapted to be threaded onto the bolt by a crank 149 pivotally connected to the nut 148 by pins 151. The crank 149 is provided with an enlarged portion 149*a* which is adapted to lock the cover member 142 in place when it is lowered over the cover member 142 as shown particularly in FIGURE 13. The crank remains in this position because of the off-center mounting provided by the pins 151.

Means is provided for mounting the reels in the arms 123 and consists of a shaft 156 which is adapted to be placed through the cable reel or drum. A suitable cone-shaped bearing 157 such as a double ball bearing type shown is fixed to one end of the shaft 156 by a collar 158. A brake 159 is mounted adjacent to the bearing 157. Another cone-shaped bearing 161 of a type similar to bearing 157 is provided on the threaded portion 156*a* of the shaft 156. The bearing 161 is provided with a threaded nut-like member 162 which is adapted to be rotated to tighten the shaft and bearings onto the reel. The shaft 156 is provided with bearing-like portions 156*b* which are adapted to be seated in the saddles provided in the arms 123.

Figure 8:
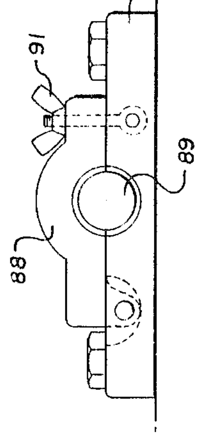
FIGURE 8 is an enlarged view of the bearing block as indicated by line 8—8 of FIGURE 4.

The reel carrying and loading apparatus 121 includes means for carrying at least two reels between the lifting equipment 19 and the cab of the vehicle. As shown, means is provided for carrying a strand or messenger reel 166 and a cable reel 167. The strand or messenger reel 166 is carried by a shaft 156 which is supported in special pedestal bearings 168 mounted upon the framework 122. The pedestal type bearings are of a split type well known to those skilled in the art and may be opened up so that the shaft 156 can be mounted in or removed from the pedestal type bearing. A similar construction is shown in FIGURE 8 of the drawing.

Another pair of special pedestal bearings 171 are mounted on a framework provided to receive the shaft 156 for the large cable reel 167. These pedestal type bearings are also adapted to be split apart to permit insertion and removal of the shaft 156 carrying the cable reel 167.

Cable guiding means 92 similar to that hereinbefore described is mounted on a framework 77 between the boom structure and the cab and above the reel carrying and loading means.

Figures 9, 10:
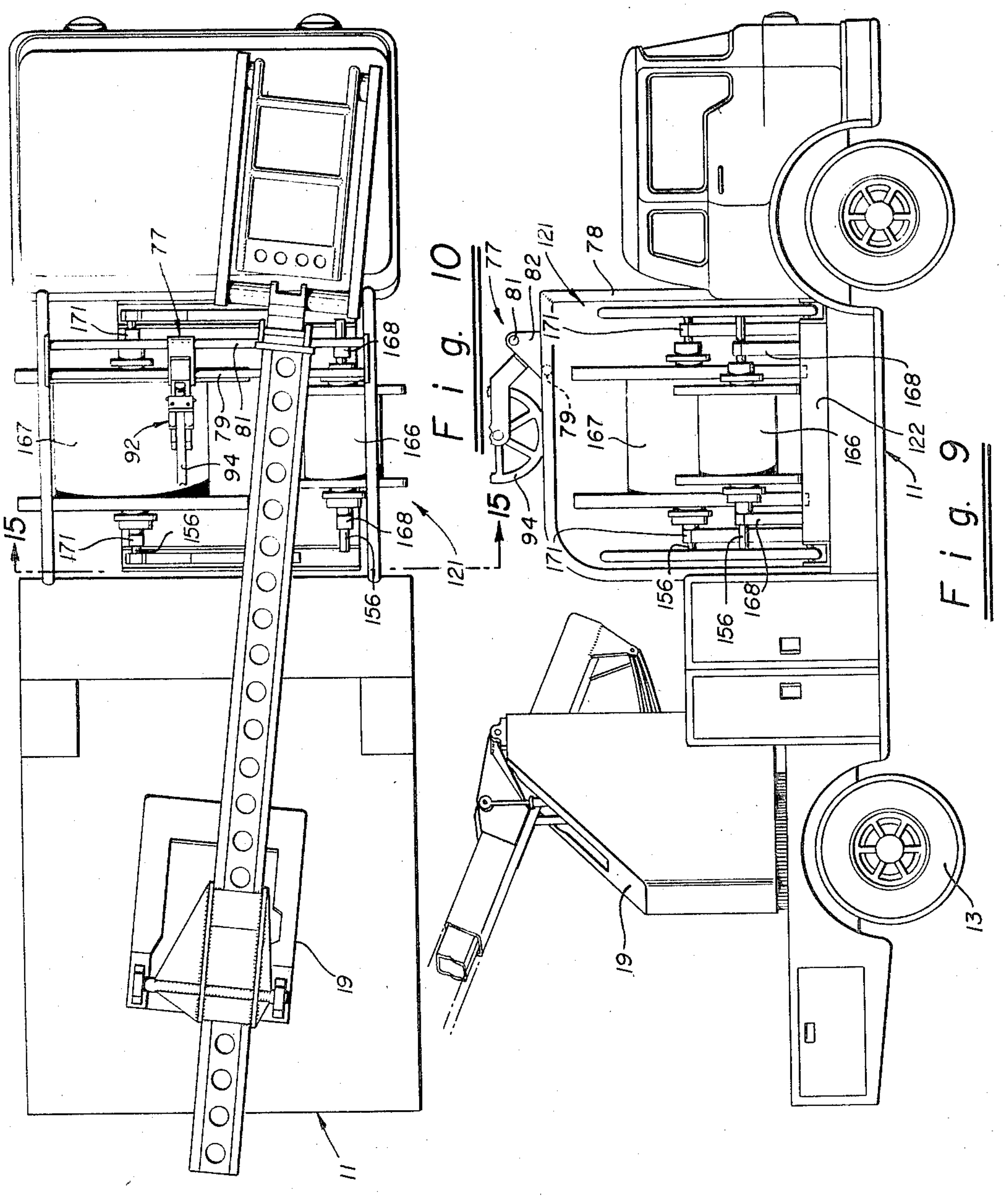
FIGURE 9 is a side elevational view of another embodiment of my apparatus with a portion thereof broken away.
FIGURE 10 is a plan view of the cable carrying and loading apparatus.

Operation of this embodiment of my apparatus may now be briefly described as follows:

Let it be assumed that no reels are mounted on the truck and that it is desired to mount a strand or messenger reel and a cable reel on the vehicle. Because of the construction of the apparatus, the reel on the driver's right-hand side, as shown in FIGURE 10, must first be placed on the vehicle. With the strand or messenger reel 166 in a position on the driver's left-hand side of the truck, a shaft 156 with the bearing 157 affixed thereto is inserted in the reel and the shaft is fastened to the reel by tightening the nut 162 of bearing 161. Suitable hydraulic means (not shown) operated by the vehicle engine is actuated to cause the actuators 129 to lower the arm 123 to the position shown in FIGURE 11. The clamping means 141 on the outermost end of the arms are then opened. The messenger reel is then rolled in between the two arms 123 so that the shaft 156 will be in alignment with the arcuate notches 137 in the arms 123.

The hydraulic actuators 129 are then operated to raise the arm 123 to seat the shaft 156 in the arcuate notches or saddles 137. Thereafter, the cover members 142 are dropped into place over the bolts 147 and the nuts 148 are threaded onto the bolts by the cranks 149. The cranks are then moved into a position overlying the cover members 142 to lock the cover members 142 in place.

After this has been accomplished, the hydraulic actuators are operated to lift the reel and to swing it onto the vehicle. With the pedestal bearings 168 in an open position, the arms 123 are moved to a position in which the shaft 156 is lowered into the pedestal bearing as shown in dotted lines in FIGURE 15. The pedestal bearings are then closed to lock the shaft 156 in place and the clamping means on the arms 123 are released.

Figures 11, 12, 13:
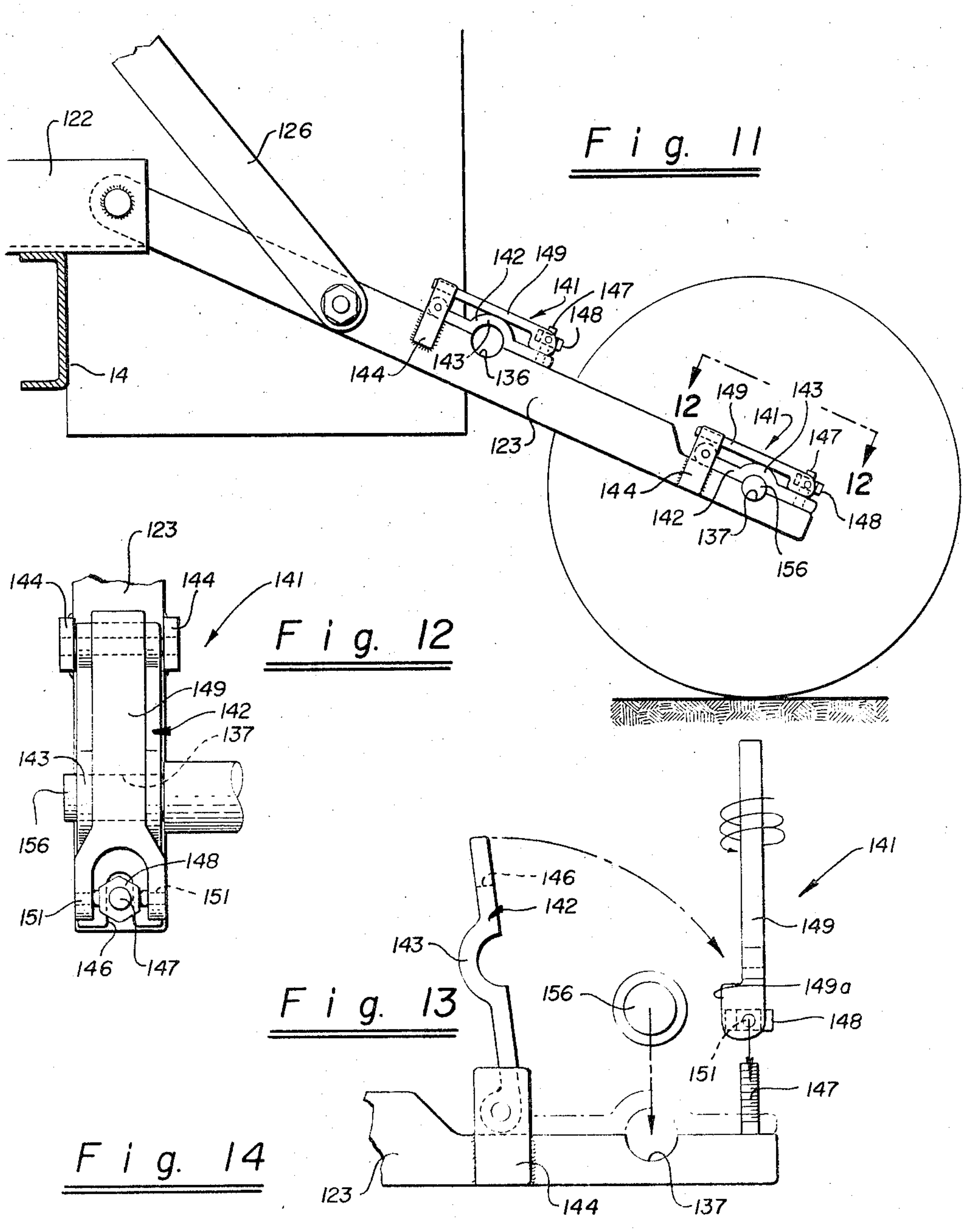
FIGURE 11 is an end elevational view looking towards the rear of the apparatus showing a portion of the cable loading and carrying apparatus.
FIGURE 12 is a detail view looking along the line 12—12 of FIGURE 11.
FIGURE 13 is a view showing the operation of the portion of the cable loading apparatus shown in FIGURE 12.
Figure 14:
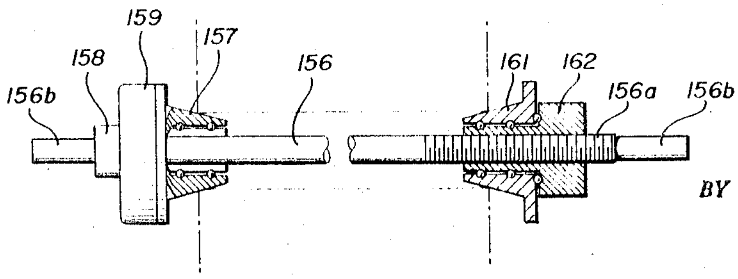
FIGURE 14 is a detail view partly in cross-section showing the means for mounting the reel.
Figure 16:
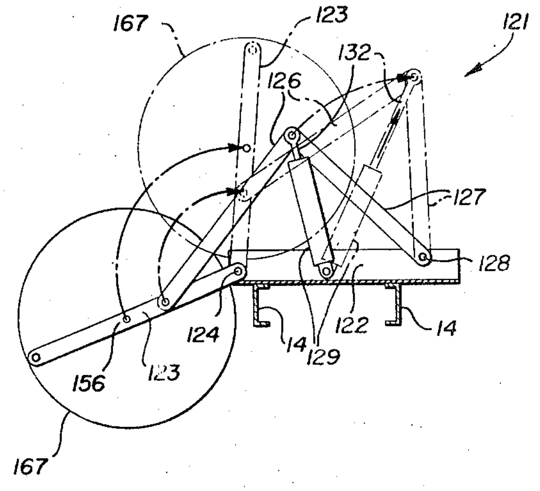
FIGURE 16 is a view similar to FIGURE 15 showing the loading of the cable drum or reel onto the vehicle.
Figure 15:
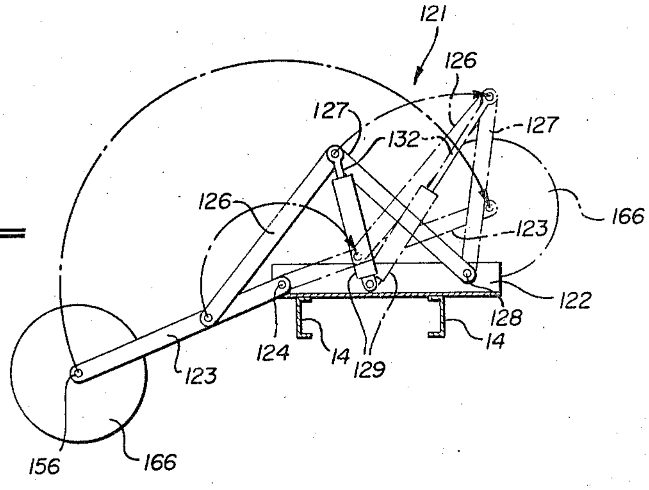
FIGURE 15 is a view taken along the line 15—15 of FIGURE 10 showing the operation of the cable loading and carrying apparatus in loading a strand or messenger reel onto the vehicle.

After the messenger reel has been placed on the vehicle, the vehicle is properly positioned adjacent the cable reel desired to be loaded onto the vehicle. Thereafter, the arms 123 are lowered by the hydraulic actuators 129 over the cable reel. A shaft 156 is mounted in the cable reel in a manner similar to that hereinbefore described and seated in the arcuate slots 136 by raising of the arms 123. The clamping means are secured and the hydraulic actuators are operated to raise the cable reel to a position which is slightly over center and into the opened pedestal bearings 171 as shown in FIGURE 16. As soon as the cable reel has been positioned in the pedestal bearings, the pedestal bearings are locked into position. The clamping means 141 on the arms 123 remain engaged with the shaft 156 and serve to help support the load of the cable reel 167. It will be noted that the arms 123 are slightly over center as shown in FIGURE 11.

After the cable reels have been loaded onto the vehicles, the strand and cable may be payed out separately through the cable guiding means 92 as shown in FIGURE 9 of the drawing. Normally, the strand or messenger and cable are payed out at different times; however, if desired, both may be payed out simultaneously merely by providing additional cable guiding means.

When it is desired to remove the reels, removal is accomplished in a manner which should be readily apparent from the foregoing description. The large cable 167 is removed first and lowered onto the ground whereas thereafter the small messenger reel 166 is removed from the vehicle.

When additional reels are required, the reels can be hauled to the job site and readily loaded onto the reel carrying apparatus.

Figures 17, 18:
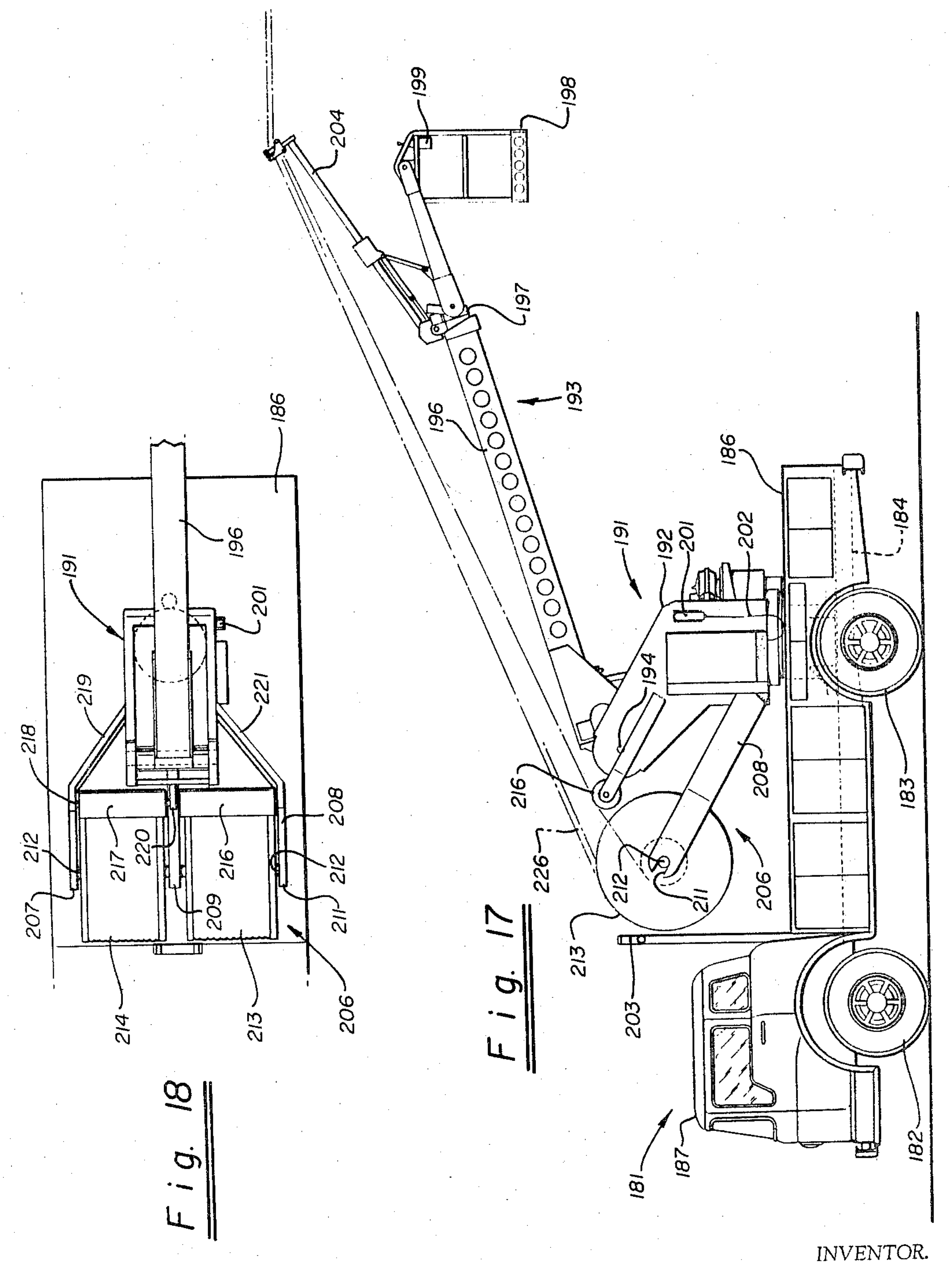
FIGURE 17 is a side elevational view of still another embodiment of my apparatus for placing aerial cable.
FIGURE 18 is a partial plan view of the apparatus shown in FIGURE 17.

Still another embodiment of my apparatus for placing aerial cable and messenger is shown in FIGURES 17 and 18. It consists of a self-propelled vehicle 181 having front and rear wheels 182 and 183 and a framework 184 mounted upon the wheels. The vehicle also includes a platform 186 which is mounted on the rear portion of the framework 184 and a cab 187 which is mounted on the front portion of the framework 184. The cab 187 encloses a motor and controls are utilized for driving the vehicle.

A lifting equipment 191 is mounted on the rear portion of the vehicle and preferably overlies the rear wheels 183 as shown in the drawing. This lifting equipment is similar to the lifting equipment disclosed in my copending application Serial No. 121,535, filed July 3, 1961.

The lifting equipment 191 includes a load supporting structure 192 which is mounted for rotation about a vertical axis. Means is provided for rotating this load supporting structure about the vertical axis as disclosed in my copending application Serial No. 121,535, filed July 3, 1961. A boom structure 193 is mounted on the load supporting structure 192 for swinging movement about a horizontal axis 194. Means is provided for raising and lowering a boom sturcture 193 about this horizontal axis 194 as disclosed in my copending application Serial No. 121,535, filed July 3, 1961. The boom structure 193 includes an outer boom 196 and an inner boom 197. The inner boom telescopes within the outer boom and means is provided for extending and retracting the inner boom 197 with respect to the outer boom 196 as disclosed in my copending application Serial No. 121,535, filed July 3, 1961.

A workman's basket 198 is pivotally mounted on the outer end of the inner boom structure 197. A control switch 199 of the type disclosed in my Patent No. 2,841,-659 is mounted within the basket 198 and is provided so that the workman in the basket 198 can control the movement of the outer end of the boom structure. As described in my copending application Serial No. 121,535, filed July 3, 1961, the control switch 199 can be utilized for rotating the load supporting structure 192 about the vertical axis, raising and lowering the boom structure about the horizontal axis 194 and extending and retracting the inner boom section 197 with respect to the outer section 196.

A control box 201 is removably mounted on the load supporting structure 192 and is provided with means so that it can control the same functions that can be controlled by the control switch 199. The control box 201 is provided with a flexible control cable 202 so that the operator handling the control box 201 can either stand upon the platform 186 or stand upon the ground to control the movement of the boom structure in the same manner that it is controlled by the control switch 199. Thus, it can be seen that the control switch 199 or the control box 201 can be utilized for rotating the outer end of the boom structure 193 about a vertical axis raising and lowering the same about a horizontal axis and moving the same toward and away from the vehicle by extending and retracting the inner boom section 197.

A rest 203 is provided immediately to the rear of the cab 187 and is provided for supporting the boom structure 193 when it is not in use.

Cable guiding means 204 of the type described in my copending application Serial No. 93,684, filed March 6, 1961, is mounted on the outer end of the boom structure 193 and, as shown, is secured to the inner boom section 197. Suitable reel carrying means 206 is provided on the vehicle and, as shown in the drawings, consists of arms 207 and 208 which are secured to the sides of the load supporting structure 192 so that they extend rearwardly and outwardly from the structure 192 for a considerable distance and then extend rearwardly parallel to the longitudinal axis of the vehicle 181. A center arm 209 is also provided and is secured to the load supporting structure 192. It extends rearwardly parallel to the longitudinal axis of the vehicle. The outer ends of the arms 207, 208 and 209 are provided with open ended slots 211 which are adapted to receive a pair of shafts 212. A pair of reels 213 and 214 are rotatably mounted upon the shafts. The reels 213 and 214 may be utilized for carrying any suitable flexible elongate member which it is desired to position in the air, as for example, on poles. One of the reels can contain a multi-pair telephone cable whereas the other reel can carry messenger or strand. However, if desired, both of the reels 213 and 214 can be utilized for carrying telephone cable. Thus, if desired, a plurality of cables can be strung simultaneously or they can be strung one at a time.

If desired, additional cable guiding means can be disposed between the reels 213 and 214 and the cable guiding means 204 in order to clear the boom structure 193 and the load supporting structure 192 in all positions of the boom structure 193. Such means can consist of a pair of rollers 216 and 217 affixed to a shaft 218 rotatably mounted in arms 219, 220 and 221 secured to the load supporting structure 192 and positioned so that they will prevent the cable or cables as they are unreeled from the reels 213 and 214 from coming into engagement with the load supporting structure 192 or the boom structure 193, as for example, when the inner portion of the cable is being unwound from the reel as shown by the broken line in FIGURE 17 of the drawings. This will prevent damage or injury to the cable as it is being placed.

It will be noted that there is adequate clearance between the cab 187 so that the lifting equipment 191 can be rotated through 360°.

Operation and use of this apparatus shown in FIGURES 17 and 18 may now be briefly described as follows. Let it be assumed that the cable reels 213 and 214 have been mounted upon the shafts 212 and that the shafts have been positioned in these slots 211 provided in the arms 207, 208 and 209. The shafts 212 will not slide out of the slots 211 because the slots are inclined downwardly as shown particularly in FIGURE 17.

After the reels 213 and 214 have been postioned, the boom structure 193 is shifted so that it will extend in generally rearward direction as shown in FIGURE 17. The cable 226 from one of the reels 213 and 214 is unreeled from a position generally forward of the boom structure when the boom structure is extending rearwardly and is passed in a substantially rearward direction generally overlying the boom structure through the cable guiding means 204 and then dead ended in a suitable manner such as to a pole. The cable can then be positioned in the desired manner at the desired elevation as the vehicle is advanced as shown in FIGURE 17 by controlling the position of the outer end of the boom structure. As hereinbefore explained, the outer end of the boom structure can be positioned by the operator in the workman's basket 198 by operating the control switch 199 or by an operator standing on the platform 186 and utilizing the control box 201. However, it is often desirable that this be accomplished by the operator in the workman's basket 198 because this operator can perform additional functions such as placing cable blocks on the messenger to support the cable as it is payed out. Alternatively, the operator can also control the movement of cable lashing apparatus as described in copending application Serial No. 166,035, filed January 15, 1962.

It will be noted that this apparatus has the particular advantage in that it is unnecessary to place any lateral bend in the cable because the cable reels 213 and 214 move with the load supporting structure 192 as it is rotated about its vertical axis. Also with this arrangement, it will be noted that the use of a castered bull wheel is not required as in the previously disclosed embodiments. Also with this arrangement, it can be seen that substantially no bends are placed in the cable as it passes from the reel to the cable guiding means 204 provided on the outer end of the boom structure.

It will be noted that the reels 213 and 214 extend outwardly from the load supporting structure 192 in a direction which is opposite to the direction in which the boom structure 193 extends from the load supporting structure. Thus, it can be seen that the reels 213 and 214 and the reel supporting means serves as a counterbalance for the boom structure 193. This is particularly advantageous when the boom structure 193 extends in a direction substantially at right angles to the longitudinal axis of the vehicle or, in other words, is being utilized to pay cable off to the side of the vehicle. The counterbalancing effect of the reels and the reel supporting means will prevent sidewise tipping of the vehicle.

Figure 19:
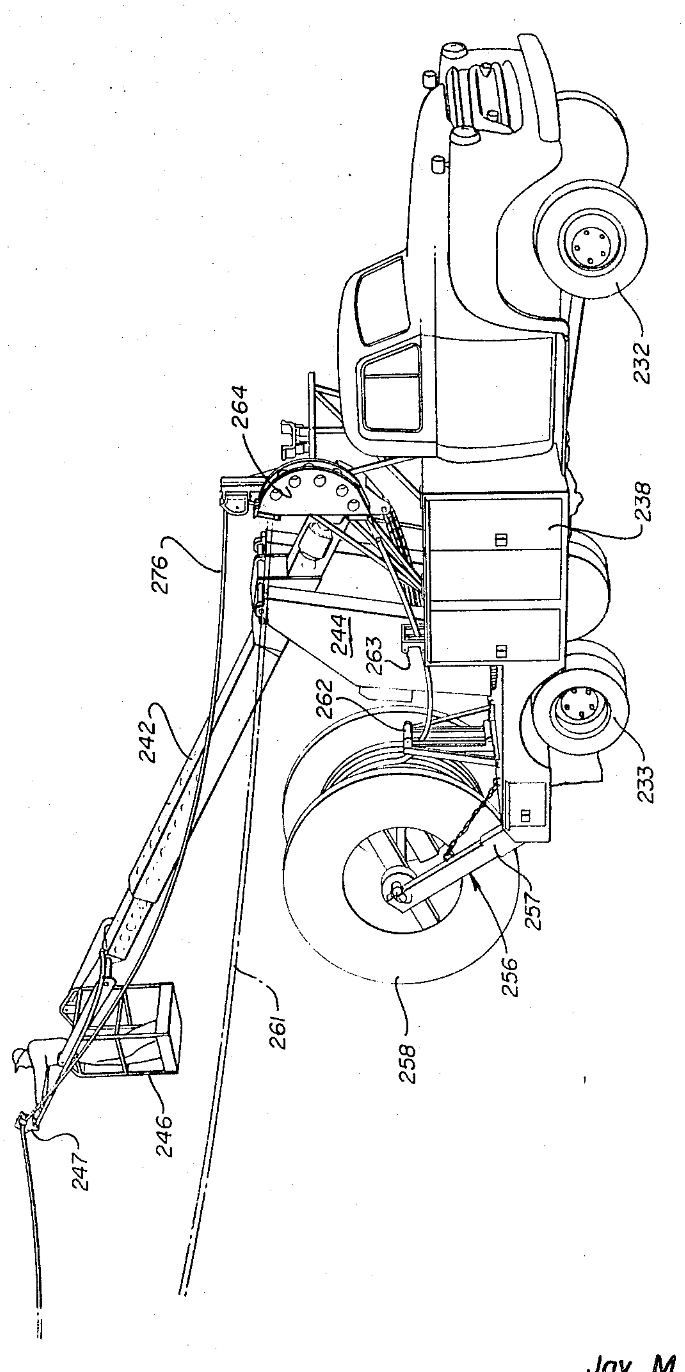
FIGURE 19 is a perspective view of still another embodiment of my apparatus for placing aerial cable.
Figure 20:
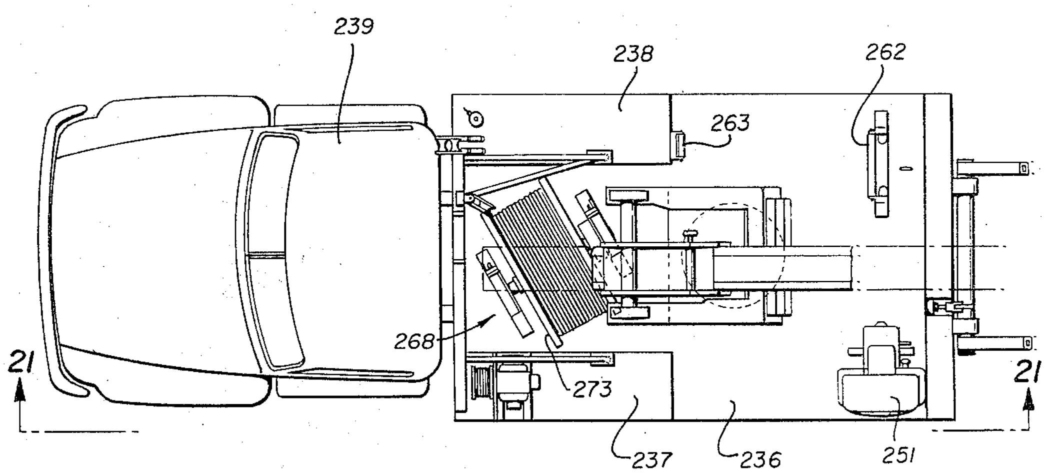
FIGURE 20 is a top plan view of the apparatus shown in FIGURE 9 with certain parts being shown in broken lines.
Figure 21:
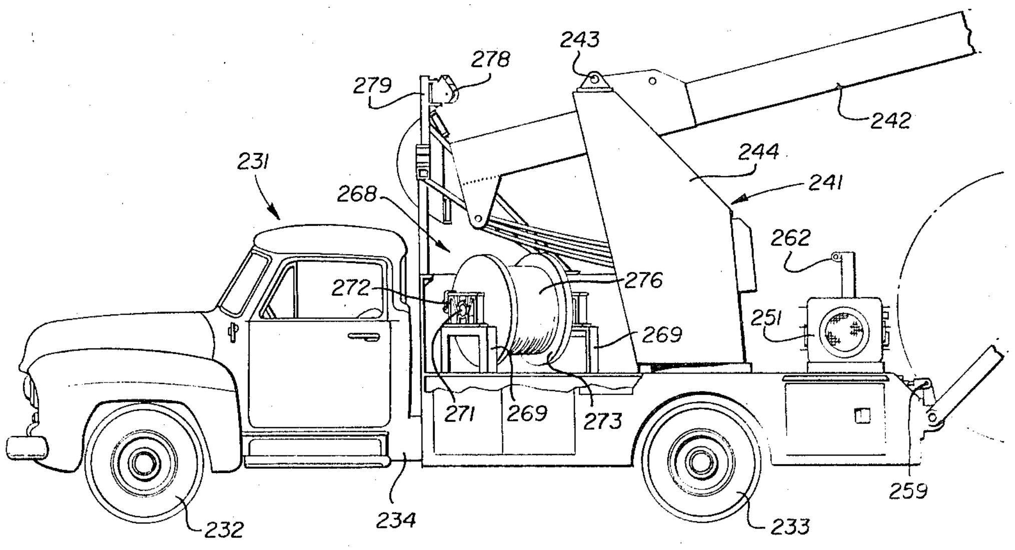
FIGURE 21 is a view looking along the line 21—21 of FIGURE 20.

A still further embodiment of my apparatus for placing aerial flexible elongate members is shown in FIGURES 19, 20 and 21. It consists of a self-propelled vehicle 231 which is provided with front and rear wheels 232 and 233, and a framework 234 mounted upon the wheels. The self-propelled vehicle also includes a platform 236 mounted upon the framework and cabinets 237 and 238 mounted on opposite sides of the platform to the rear of the cab 239 provided on the vehicle. The cab 239 encloses a motor and controls which are utilized for operating the vehicle.

A lifting equipment 241 is mounted on the framework 234 and generally overlies the rear wheels 233. The lifting equipment 241 is somewhat similar to the lifting equipment described in Patent Nos. 2,841,404; 2,896,750; and 2,936,847, and includes an extensible boom structure 242 which is pivotally mounted on a rod 243 which is mounted upon a lift supporting structure 244 to permit swinging movement of the boom structure about a horizontal axis. The lift supporting structure 244 is mounted for movement about a vertical axis in the same manner as disclosed in Patent Nos. 2,841,404; 2,896,750; and 2,936,-847. Means (not shown) is provided for extending and retracting the boom structure, swinging the same about the horizontal axis 243 and rotating the lift supporting structure 244 about a vertical axis. A workman's basket or support platform 246 is mounted on the outer end of the extensible boom structure 242 as shown particularly in FIGURE 19, and control means (not shown) is mounted in the workman's basket and also upon the lift supporting structure 244 to permit operation of the controls for the lifting equipment 241. Cable guiding means 247 of a type similar to that disclosed in Patent No. 2,949,279 is mounted on the outer end of the boom structure. A motor generator set 251 is provided on the platform 236 for supplying power for operation of the lifting equipment.

Reel carrying means 256 is mounted on the rear end of the vehicle and consists of a pair of arms 257 which are pivotally mounted on the rear framework and which are adapted to carry a reel of cable 258 as shown particularly in FIGURE 19. Means is provided for raising and lowering the arms 257 and consists of a hydraulic mechanism 259 mounted upon the framework of the vehicle. As can be seen in FIGURE 19, the flexible elongate element in the form of a cable 261 is payed off forwardly from the reel and is guided by cable guiding means 262 mounted upon the platform 236. Thereafter, the cable passes through additional cable guiding means 263 mounted upon the cabinets 238. The cable then passes through still further castered cable guiding means 264.

Additional reel carrying means 268 is mounted on the vehicle in a region forward of the boom structure and is shown particularly in FIGURES 20 and 21. The reel carrying means 268 consists of a pair of U-shaped members 269 which are secured to the platform 236 by suitable means such as welding. A shaft 271 is mounted upon the members 269 by suitable means such as clamping assemblies 272 which can be moved between open and closed positions to release the shaft 271. A reel 273 is rotatably mounted upon the shaft 271 and carries a suitable flexible elongate element such as messenger or strand 276. It will be noted that the reel carrying means 268 is mounted on the platform in such a manner that the reel 273 is inclined at a substantial angle with respect to the longitudinal axis of the vehicle. The positioning of the reel 273 at an angle of approximately 45° from the longitudinal axis of the vehicle facilitates feeding of the messenger to the boom structure 242. Thus, as shown in FIGURES 19, 20 and 21, the messenger is fed from the reel 273 through a guide 278 which is swivel mounted upon a post 279 secured to the vehicle. After the strand or messenger passes through the guide 278, it passes rearwardly through the guiding means 247 carried at the end of the boom structure.

The operation of the apparatus shown in FIGURES 19, 20 and 21 is very similar to that hereinbefore described. In situations where it is necessary to string the strand or messenger first, this can be accomplished by first placing a reel 273 in the reel holding means 268. The strand or messenger 276 is then passed through the guide 278 and is passed in a substantially rearward direction generally overlying the boom structure and through the cable guiding means 247. The strand or messenger can then be positioned in the desired manner at the desired elevation as the vehicle is advanced by an operator properly positioning the boom structure. After the strand or messenger has been put in place, the cable can then be payed out by passing it through the guiding devices 262, 263 and 264, and then passing it in a substantially rearward direction through the cable guiding means 247 where it is again positioned in the desired manner by positioning of the boom structure as the vehicle is advanced.

Although the embodiment of my apparatus shown in FIGURES 19, 20 and 21 does not have the relatively heavy cable reels forward of the boom structure, at least one of the reels is forward of the boom structure to facilitate paying out of the flexible elongate element. However, the reel carrying means in the rear of the vehicle is positioned in such a manner that it is centered between the rear wheels 233. It is also mounted upon the rear of the vehicle so that it is mounted as closely as possible to the rear wheels 233 while still allowing adequate clearance for rotation of the boom supporting structure 244. Thus, it can be seen that this arrangement permits the utilization of a smaller vehicle having less space on the platform 236 than is true of some of the other embodiments herein disclosed.

It is also apparent that the apparatus can be utilized for placing all types of flexible elongate aerial members, such as cable, wire and the like and that such aerial members can be placed with ease from either side of the vehicle with a minimum of bend being placed in the aerial members. Thus, power lines or power conductors and telephone cables which do not require a messenger or strand for supporting the same between the towers or poles can be readily strung with my apparatus. Similarly, telephone cables and power cables which require the use of messenger or strand also can be readily strung.

I claim:

1. In apparatus for placing an aerial flexible elongate member such as cable, a self-propelled vehicle, a boom structure having a workman's platform on its outer end, the boom structure being mounted on the vehicle and including means for rotating the outer end of the boom structure and the workman's platform secured thereto about a vertical axis, raising and lowering the same about a horizontal axis and moving the same toward and away from the vehicle, guiding mens mounted on the outer end of the boom structure and movable with the outer end of the boom structure, reel carrying means mounted on the vehicle forward of the boom structure, additional guiding means mounted on the vehicle between the reel carrying means and the boom structure, a reel removably carried by and rotatably mounted in the reel carrying means, a length of flexible elongate member coiled on said reel and being guided by said first named guiding means and said additional guiding means as it is payed off of the reel, said reel being free to rotate as the flexible elongate member is unwound and means mounted on the vehicle adjacent the reel carrying means for loading reels into and unloading reels from the reel carrying means.

2. In apparatus for placing an aerial flexible elongate member such as cable, a self-propelled vehicle, a boom structure mounted on the vehicle, said boom structure including means for rotating the outer end of the boom structure about a vertical axis, swinging the same about a horizontal axis and moving the same toward and away from the vehicle, guiding means mounted on the outer end of the boom structure and movable with the outer end of the boom structure, reel carrying means mounted on the vehicle forward of the boom structure, additional cable guiding means mounted on the boom structure between the reel carrying means and the outer end of the boom structure, a reel removably carried by and rotatably mounted in said reel carrying means, a length of flexible elongate member coiled on said reel and being guided by said first named guiding means and said additional guiding means as it is payed off of the reel, said reel being free to rotate as the flexible elongate member is unwound, and means for loading reels into and unloading reels from the reel carrying means.

3. In an apparatus for placing an aerial flexible elongate member such as cable, a self-propelled vehicle, a boom structure having a workman's platform on its outer end, the boom structure being mounted on the vehicle and including means for rotating the outer end of the boom structure and the workman's platform secured thereto about a vertical axis, raising and lowering the same about a horizontal axis and moving the same toward and away from the vehicle, guiding means mounted on the outer end of the boom structure adjacent to said workman's platform and accessible to a workman thereon and movable with the outer end of the boom structure, reel carrying means mounted on the vehicle forward of the boom structure, castered guide wheel means mounted on the vehicle between the reel carrying means and the boom structure, a replaceable supply reel, means removably mounting said reel on said reel carrying means, said reel carrying means, said reel and said means removably mounting said reel being open and readily accessible to facilitate easy replacement of the reel, and a length of flexible elongate member coiled on said reel and being guided by said first named guiding means and said castered guide wheel means as it is payed off of the reel, said reel being free to rotate as the flexible elongate member is pulled from the reel.

4. Apparatus as in claim 3 wherein said castered guide wheel means also includes means for permitting movement of the guide wheel on an axis which is substantially parallel to the axis of rotation of the guide wheel.

5. Apparatus as in claim 3 wherein the reel carrying means and the reel are positioned so that they serve as a counterbalance for the boom structure.

6. In apparatus for placing an aerial flexible elongate member such as a cable, a self-propelled vehicle, a boom structure having a workman's platform mounted on its outer end, the boom structure being mounted on the vehicle and including means for rotating the outer end of the boom structure and the workman's platform secured thereto about a vertical axis, raising and lowering the same about a horizontal axis and moving the same toward and away from the vehicle, guiding means mounted on the outer end of the boom structure and movable with the outer end of the boom structure, reel carrying means carried on the vehicle forward of the boom structure, additional guiding means carried on the vehicle between the reel carrying means and the outer end of the boom structure, a reel removably carried by and rotatably mounted in the reel carrying means, a length of flexible member coiled on said reel and being guided by said first-named guiding means and said additional guiding means as it is payed off of the reel, said reel being capable of rotation as the flexible elongate member is unwound, and means carried on the vehicle for loading reels into and unloading reels from the reel carrying means.

7. In apparatus for placing an aerial flexible elongate member such as a cable, a self-propelled vehicle, a boom structure having a workman's platform on its outer end, the boom structure being mounted on the vehicle and including means for rotating the outer end of the boom structure and the workman's platform secured thereto about a vertical axis, raising and lowering the same about a horizontal axis and moving the same toward and away from the vehicle, guiding means mounted on the boom structure adjacent to said workman's platform and accessible to a workman thereon and movable with the outer end of the boom structure, reel carrying means carried on the vehicle forward of the boom structure, additional guiding means carried on the vehicle between the reel carrying means and the outer end of the boom structure, a replaceable supply reel, means removably mounting said supply reel on said reel carrying means, said reel carrying means, said supply reel and said means for removably mounting said supply reel being open and readily accessible to facilitate easy replacement of the supply reel, and a length of flexible elongate member coiled on said supply reel and being guided by said first-named guiding means and said additional guiding means as it is payed off of the reel, said supply reel being capable of rotation as the flexible elongate member is pulled from the supply reel.

8. In apparatus for placing an aerial flexible elongate member such as cable, a self-propelled vehicle, a lifting equipment mounted on the vehicle, said lifting equipment including a load supporting structure rotatably mounted upon the vehicle for rotation about a vertical axis, a boom structure pivotally mounted on the load supporting structure for movement about a substantially horizontal axis, and a workman's platform mounted on the outer end of the boom structure, said lifting equipment also including control means for causing rotation of the outer end of the boom structure and the workman's platform secured thereto about a vertical axis, raising and lowering the same about a horizontal axis and moving the same toward and away from the vehicle, guiding means mounted on the boom structure adjacent to said workman's platform and accessible to a workman thereon and movable with the outer end of the boom structure, reel carrying means mounted upon the load supporting structure so that the reel carrying means is positioned forward of the boom structure when the boom structure is extending in a direction substantially towards the rear of the vehicle, a replaceable supply reel, means removably mounting said supply reel on said reel carrying means, said supply reel and said means for removably mounting said supply reel being open and readily accessible to facilitate easy replacement of the supply reel, and a length of flexible elongate member coiled on said reel and being guided by said guiding means as it is payed off of the reel, said supply reel being capable of rotation as the flexible elongate member is pulled from the supply reel.

No references cited.

REINALDO P. MACHADO, *Primary Examiner.*